(12) United States Patent
Ishii et al.

(10) Patent No.: US 10,042,438 B2
(45) Date of Patent: Aug. 7, 2018

(54) SYSTEMS AND METHODS FOR TEXT ENTRY

(71) Applicant: Sharp Laboratories of America, Inc., Camas, WA (US)

(72) Inventors: Atsushi Ishii, Vancouver, WA (US); Hong Jin, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 53 days.

(21) Appl. No.: 14/788,734

(22) Filed: Jun. 30, 2015

(65) Prior Publication Data

US 2017/0003762 A1 Jan. 5, 2017

(51) Int. Cl.

| | |
|---|---|
| *G09G 5/00* | (2006.01) |
| *G06F 3/0346* | (2013.01) |
| *G06F 3/01* | (2006.01) |
| *G06F 3/0488* | (2013.01) |
| *G06F 3/038* | (2013.01) |
| *G06F 3/0484* | (2013.01) |
| *G06F 3/0482* | (2013.01) |
| *G06F 1/16* | (2006.01) |
| *G04G 21/02* | (2010.01) |

(52) U.S. Cl.
CPC ........... *G06F 3/0346* (2013.01); *G04G 21/02* (2013.01); *G06F 1/163* (2013.01); *G06F 1/1698* (2013.01); *G06F 3/017* (2013.01); *G06F 3/0383* (2013.01); *G06F 3/0482* (2013.01); *G06F 3/04842* (2013.01); *G06F 3/04886* (2013.01); *G06F 2203/0331* (2013.01)

(58) Field of Classification Search
CPC . G06F 3/01; G06F 3/014; G06F 3/017; G06F 3/0236; G06F 3/0346; G06F 3/0482; G06F 3/04842; G06F 3/04886; G06F 2203/0331

USPC ......................................... 345/156, 168, 169
See application file for complete search history.

(56) References Cited

U.S. PATENT DOCUMENTS

| | | | |
|---|---|---|---|
| 6,380,923 | B1 | 4/2002 | Fukumoto et al. |
| 7,148,879 | B2 | 12/2006 | Amento et al. |
| 8,031,172 | B2 | 10/2011 | Kruse et al. |
| 8,243,051 | B2 | 8/2012 | Gorodetskiy et al. |
| 8,341,544 | B2 * | 12/2012 | Kerr .................... H04N 5/44513 715/786 |

(Continued)

FOREIGN PATENT DOCUMENTS

| | | |
|---|---|---|
| CN | 1480899 | 3/2004 |
| CN | 102043467 | 5/2011 |

OTHER PUBLICATIONS

Logbar, "Ring," www.lobar.jp/ring/en/, Jan. 10, 2015.

(Continued)

*Primary Examiner* — Jason Mandeville
(74) *Attorney, Agent, or Firm* — ScienBiziP, P.C.; Steve Reiss

(57) ABSTRACT

A system for text entry for a computing device is described as including a sensor device and a computing device. The sensor device includes a motion sensor. The computing device is in wireless communication with the sensor device. The computing device includes a display and a processor configured to present a user input screen on the display, to receive motion data from the sensor device, to select a key based on the motion data and to present the selected key on the display.

19 Claims, 14 Drawing Sheets

Finger Ring-like Sensor Device
102

Wireless Communication
106

Wearable Device
104

(56) References Cited

U.S. PATENT DOCUMENTS

| | | |
|---|---|---|
| 8,384,667 B2 | 2/2013 | Chang |
| 8,436,817 B2 | 5/2013 | Oh |
| 8,681,101 B1 | 3/2014 | Haney et al. |
| 9,104,271 B1* | 8/2015 | Adams .................. G06F 3/0426 |
| 9,495,575 B2* | 11/2016 | Kim ........................ H04B 1/385 |
| 9,582,076 B2* | 2/2017 | Kienzle .................. G06F 3/014 |
| 2003/0011573 A1* | 1/2003 | Villet .................... G06F 3/0233 |
| | | 345/169 |
| 2003/0064736 A1 | 4/2003 | Bickerton et al. |
| 2003/0142065 A1 | 7/2003 | Pahlavan |
| 2003/0214481 A1 | 11/2003 | Xiong |
| 2004/0032346 A1* | 2/2004 | Kim ........................ G06F 3/014 |
| | | 341/20 |
| 2004/0263473 A1 | 12/2004 | Cho et al. |
| 2005/0009584 A1* | 1/2005 | Park ....................... H04B 1/385 |
| | | 455/575.6 |
| 2006/0001646 A1 | 1/2006 | Hai |
| 2008/0252603 A1* | 10/2008 | Dietz .................... G06F 1/1626 |
| | | 345/169 |
| 2009/0153389 A1* | 6/2009 | Kerr ................... H04N 5/44513 |
| | | 341/176 |
| 2009/0251407 A1* | 10/2009 | Flake ..................... G06F 3/014 |
| | | 345/156 |
| 2010/0073329 A1 | 3/2010 | Raman et al. |
| 2011/0210931 A1* | 9/2011 | Shai ........................ G06F 3/014 |
| | | 345/173 |
| 2012/0293410 A1 | 11/2012 | Bell |
| 2014/0022165 A1* | 1/2014 | Melamed ................ G06F 3/014 |
| | | 345/156 |
| 2014/0176809 A1 | 6/2014 | Chen |
| 2016/0034742 A1* | 2/2016 | Kim ........................ H04B 1/385 |
| | | 382/124 |
| 2016/0077587 A1* | 3/2016 | Kienzle .................. G06F 3/014 |
| | | 345/156 |
| 2016/0124579 A1* | 5/2016 | Tokutake .............. G06F 3/0481 |
| | | 345/156 |
| 2016/0253044 A1* | 9/2016 | Katz ........................ G06F 3/017 |
| 2017/0351345 A1* | 12/2017 | Nirjon .................. G06F 3/0346 |

OTHER PUBLICATIONS

Fujitsu Gesture Based Text Entry, www.k-tai.impress.co.jp/docs/news/20150113_683443.html, Jan. 13, 2015.

Nguyen, Chuong, "Futitsu's Keyboard of the Future Requires No Hardware Keys," www.gottabemobile.com/2013/03/04/fujitsus-keyboard-of-the . . . , Mar. 4, 2013.

* cited by examiner

SYSTEMS AND METHODS FOR TEXT ENTRY

TECHNICAL FIELD

The present disclosure relates generally to receiving user input. More specifically, the present disclosure relates to systems and methods for text entry.

BACKGROUND

The use of electronic devices has become commonplace in modern society. Electronic devices have become smaller and more powerful in order to meet consumer needs and to improve portability and convenience. Electronic devices that are commonly used include computing devices, such as personal computers or laptops. Other electronic devices commonly used include cellular phones, smart phones, Personal Digital Assistants, tablet devices, netbooks, e-readers, Global Positioning Satellite (GPS) units, etc. Consumers have become dependent upon electronic devices and have come to expect increased functionality.

Wearable computers, or small computer devices to be worn on a human body, such as watches, glasses, smart shoes, etc., are becoming increasingly popular. However, the majority of such computers still exist as accessories of smartphones rather than standalone devices. There are several technical issues that must be addressed for wearable computers to enable them to be used as mainstream standalone devices. Such issues include short battery life, limited network connectivity and small display space, among other technical issues.

Cumbersomeness of entering text is considered to be one of the biggest problems for wearable computers. Unlike smartphones or tablet devices, wearable computers in general do not have a sufficient space or even no space to display a keypad or keyboard large enough for users to operate comfortably to enter text using fingers. As can be seen from this discussion, systems and methods that improve text entry for wearable computers may be beneficial.

DETAILED DESCRIPTION

Figure 1:
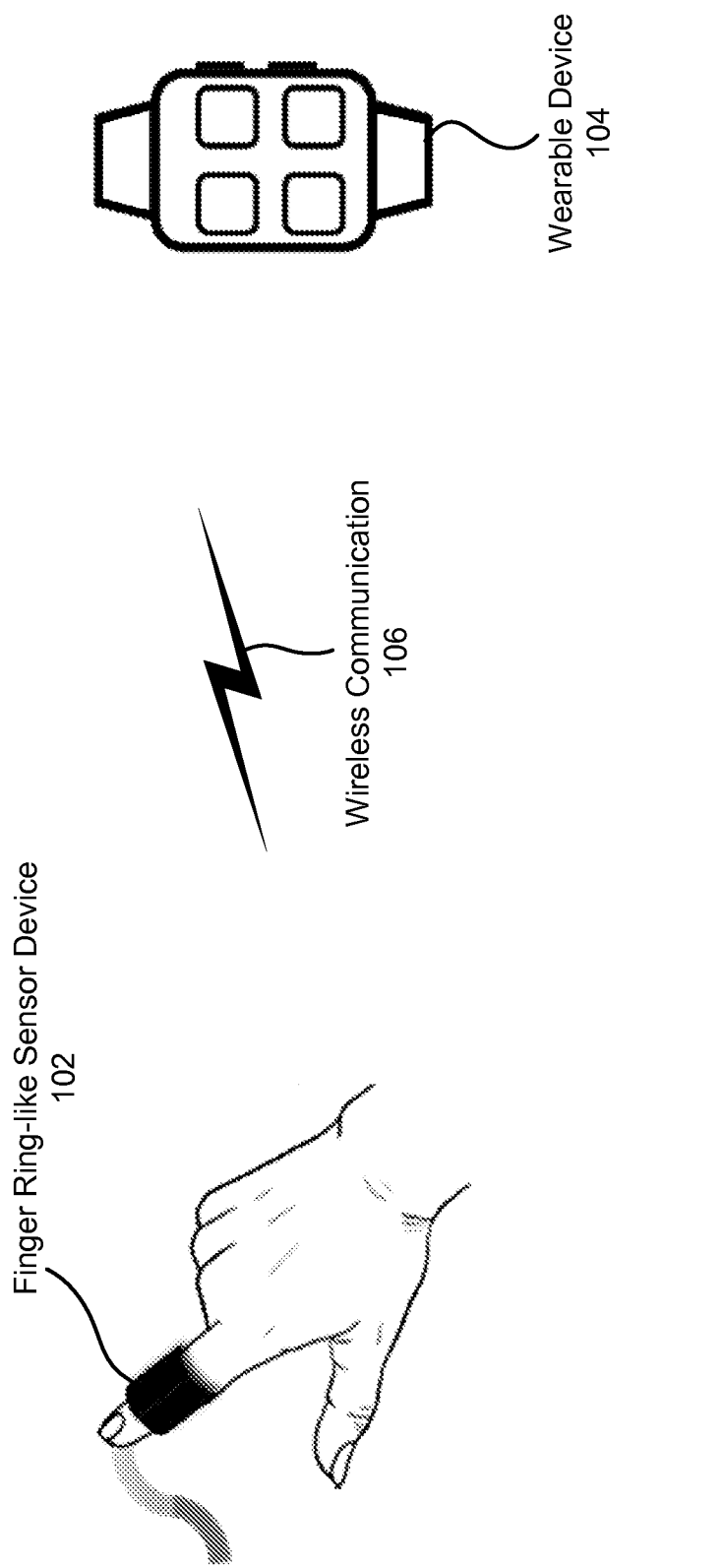
FIG. 1 is a diagram illustrating one configuration of a system for entering text on a wearable computing device.

A system for text entry for a computing device is described. The system includes a sensor device having a motion sensor and a computing device in wireless communication with the sensor device. The computing device includes a display and a processor configured to present a user input screen on the display, to receive motion data from the sensor device, to select a key based on the motion data and to present the selected key on the display.

The user input screen may include a virtual keyboard. A user does not need to physically touch the computing device in order to select a key on the computing device. The virtual keyboard may be divided into a plurality of segments, and the segments may be identified on the display.

The user may select the key on the computing device through a finger motion of the finger wearing the sensor device where the finger does not physically touch the computing device. The finger motion may be in free space.

The processor may further be configured to receive first motion data from the sensor device and to select a specific segment from the plurality of segments based on the first motion data. The first motion data may include a signal representing a tap, and the motion data may include a signal representing a swipe such that the key was selected by a user performing a finger tap and a finger swipe.

A method for entering text on a computing device is also described. Motion is detected on a sensor device. Motion data is transmitted from the sensor device to a computing device. A selected key is identified at the computing device based on the motion data. A user input screen is presented on a display of the computing device, where the user input screen presents the selected key on the display.

A non-transitory computer-readable medium having instructions thereon is also described. The computer-readable medium has code for causing an electronic device to detect motion on a sensor device and code for causing the electronic device to transmit motion data from the sensor device to a computing device. The computer-readable medium also has code for causing the electronic device to identify a selected key at the computing device based on the motion data. The computer-readable medium further has code for causing the electronic device to present a user input screen on a display of the computing device, wherein the user input screen presents the selected key on the display.

Cumbersomeness of entering text is considered to be one of the biggest problems for wearable computers. Unlike smartphones or tablet devices, wearable computers in general do not have a sufficient space or even no space to display a keypad or keyboard large enough for users to operate comfortably with fingers. Even with this issue, some smart watch devices incorporate a touch panel on the display and present a miniature keypad/keyboard. In this case, the usability of text entry is highly degraded. In other cases, voice recognition is adopted as an alternative solution, which is not considered to be practical to use in a noisy public environment. In addition, gesture control, which is a technique to capture the visual image of body movements or shapes and graphically analyze user intentions, requires a large amount of processing power and is currently limited to simple command control, such as audio volume up/down. Furthermore, a recent approach requires users to write letters in the air and captures the strokes using motion sensors built into a ring-like device. This approach also requires a large amount of processing power in order to analyze strokes and perform pattern matching using large character sets. In general, approaches that require large amounts of processing power are likely to be unsuitable for wearable computers that have limited battery capacity.

The present systems and methods are aimed to offer an easy-to-use and practical text entry solution for wearable computer devices comprising a finger ring-like device equipped with motion sensors to detect a user's finger movements and a computer device (e.g. a wearable computer) with a display means. This invention includes a virtual keyboard/keypad presented on the display means when text entry is needed, where a letter or a plurality of letters are pre-assigned to each key of the keyboard/keypad. To determine the key currently selected on the keyboard/keypad, a process is implemented in the computer device that utilizes visual feedback on the display means to show the currently selected key. The currently selected key is recognized by a process to detect a user's intention to hit (click) the selected key by capturing designated finger motions, such as tapping or swiping. The finger motions are then analyzed after designated motions are recognized in order to determine the text entry (letter) from the pre-assigned letters that are most likely to be entered by the user.

With the present systems and methods, the user can select and hit the keys on the virtual keyboard/keypad to enter text by moving the finger that wears the ring-like device in free space, on a tabletop or anywhere he/she likes. Since the user does not need to physically touch the keyboard/keypad on the display, the approach presented in the present systems and methods works even in the case where the keyboard/keypad is too small to be operated by the finger or is physically inaccessible. Furthermore, since no image processing or complex pattern matching is required, the approach disclosed herein can be achieved with limited processing power compared to currently existing products, making it practical for devices with limited battery capacity.

Various examples of the systems and methods disclosed herein are now described with reference to the figures, where like reference numbers may indicate functionally similar elements. The systems and methods as generally described and illustrated in the figures herein could be arranged and designed in a wide variety of different implementations. Thus, the following more detailed description of several implementations, as represented in the figures, is not intended to limit scope, as claimed, but is merely representative of the systems and methods.

FIG. 1 is a diagram illustrating one configuration of a system for entering text on a wearable computing device 104. A finger ring-like sensor device 102 worn on a single finger detects finger movements. The ring-like sensor device 102 communicates wirelessly 106 with the wearable computing device 104 using a wireless communication technology, such as Bluetooth, that is used for sending the detected finger movements to the wearable computing device 104. The wearable computing device 104 translates the movements into one or more keys and outputs the key entry on the wearable device 104 display.

Figure 2:
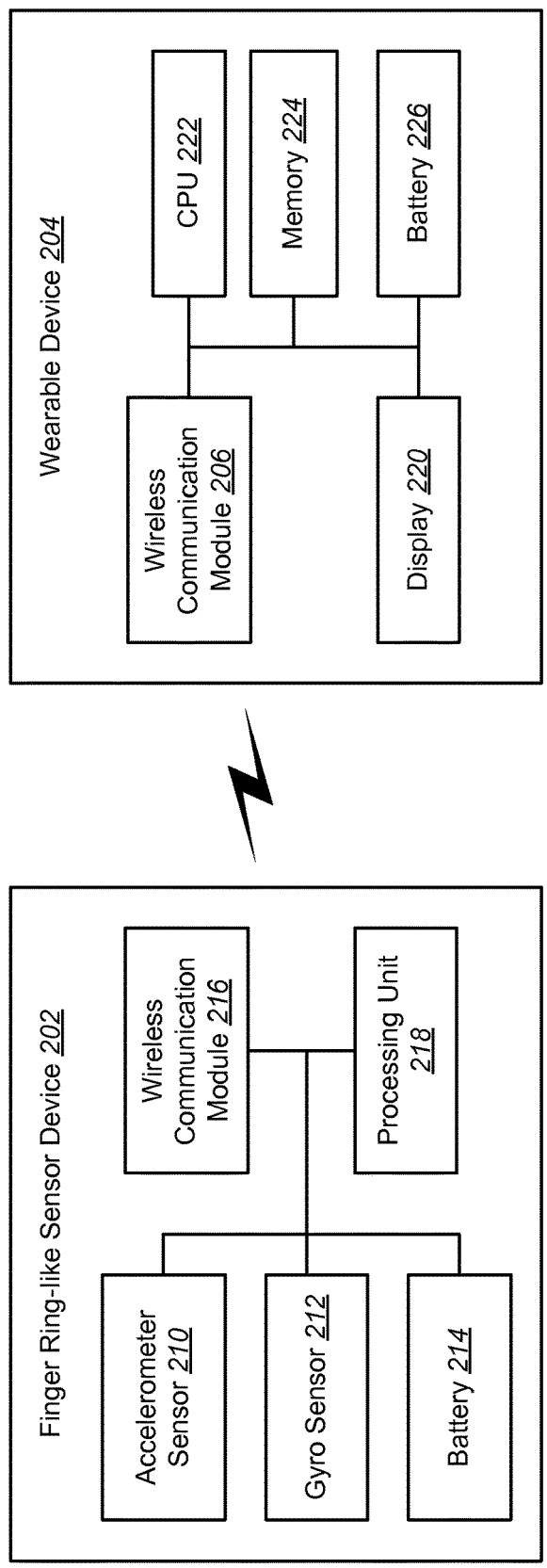
FIG. 2 is a block diagram illustrating various components that may be utilized in a ring-like sensor device and a wearable computing device.

FIG. 2 is a block diagram illustrating various components that may be utilized in a ring-like sensor device 202 and a wearable computing device 204. The finger ring-like device 202 may include one or more sensors capable of sensing movement. For example, the ring-like sensor device 202 may include an accelerometer sensor 210 and/or a gyroscope sensor 212 to sense movement of the ring-like sensor device 202. Other sensors may also be used.

The sensor device 202 also includes a wireless communication module 216 and a processor or processing unit 218. The wireless communication module 216 enables the sensor device 202 to communicate using various wireless communication technologies such as Institute of Electrical and Electronics Engineers (IEEE) 802.11, IEEE 802.16, Bluetooth, Zigbee (IEEE 802.15.4), Zwave, or any cellular communication network. The processor or processing unit 218 may comprise a microcontroller that may be coupled to the accelerometer sensor 210 and gyroscope sensor 212. The processing unit 218 may receive the signals captured by the one or more sensors 210, 212 so that they can be wirelessly transmitted to the wearable computing device 204. The device 202 may further include one or more batteries 214 to provide power to the device 202.

The wearable computing device 204 comprises a wireless communication module 206, central processing unit (CPU) 222, memory 224, battery 226 and display 220. The wireless communication module 206 is similar to, and communicates with, the wireless communication module 216 of the sensor device 202 using a wireless communication technology to facilitate communication with the finger ring-like device 202 to receive the gesture information detected. The wearable device 204 processes the information and translates it into a key entry or key selection and outputs the key entry on the display 220 of the wearable device 204. The wearable computing device 204 may be an embedded system.

The wearable computer device 204 may also include a display module 220. The display 220 may show a visual representation of the mode of data entry. For example, the display 220 may show a representation of a set of keys, a partial keyboard or a full keyboard to a user. The display 220 may include one or more means for displaying visual information. For example, the display module 220 may include a light emitting diode (LED), an LED array, a multi-color LED array, a liquid crystal display (LCD) or other structure that conveys visual information. The display 220 may provide visual feedback of the user input activity in real time.

Examples of wearable computing devices 204 include smart watches, smart glasses, smart shoes, etc. Generally, a wearable computing device 204 is an electronic device that can be worn by a user and that includes a processor or CPU 222.

Figure 3:
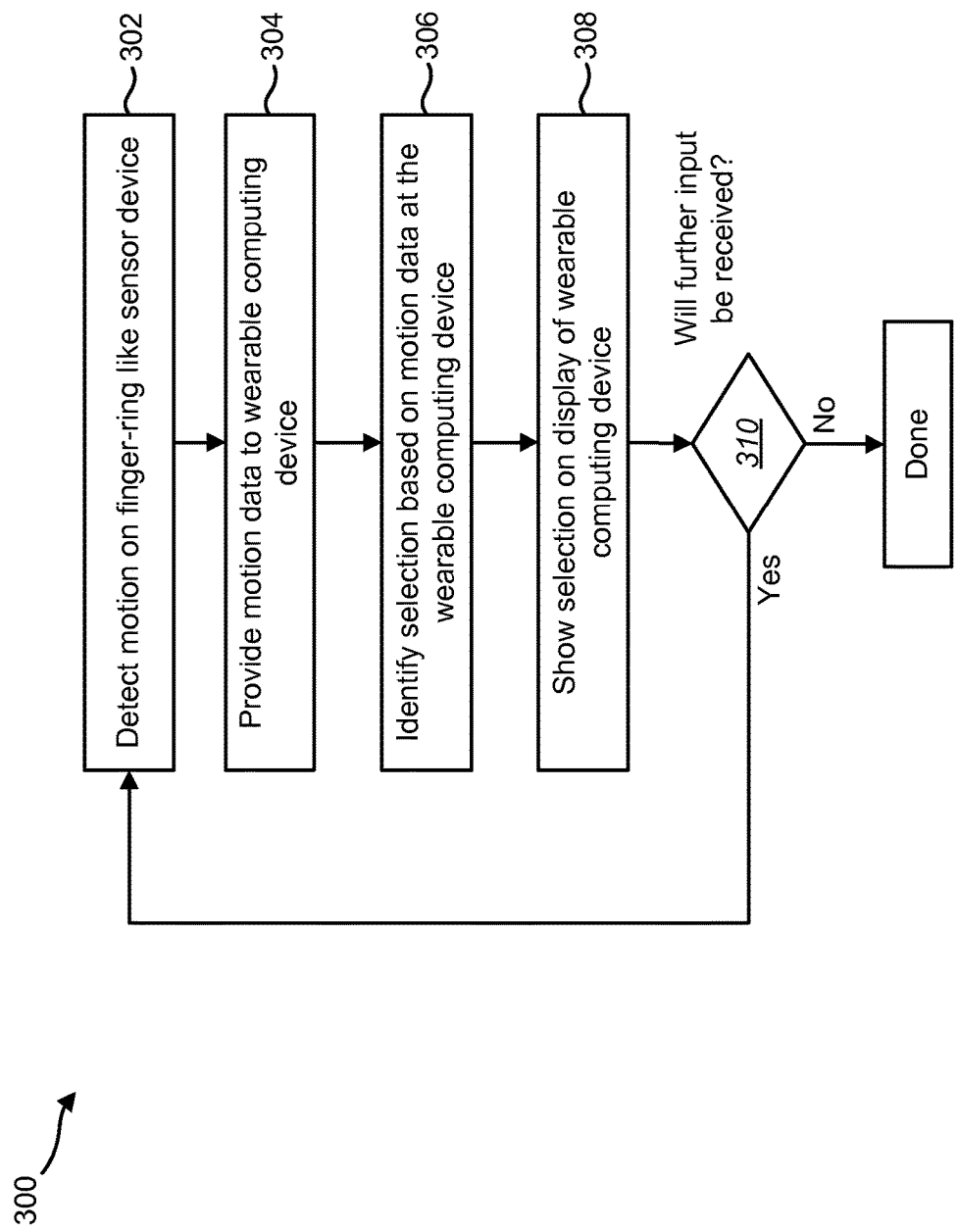
FIG. 3 is a flow diagram illustrating one configuration of a method for entering text on a wearable computing device.

FIG. 3 is a flow diagram illustrating one configuration of a method 300 for entering text on a wearable computing device 204. A finger ring-like sensor device 202 may detect 302 motion. The motion may be detected 302, for example, by an accelerometer 210 or gyroscope sensor 212. A finger ring-like sensor device 202 may provide 304 motion data to a wearable computing device 204. The motion data includes data generated by a sensor in the sensor device 202. The motion data may be wirelessly transmitted to the computing device 204. A selection may then be identified 306 based on motion data at the wearable computing device 204. The selection may be shown 308 on the display 220 of the wearable computing device 204. After the selection has been shown 308 on the display 220, it should be determined 310 whether further input is to be received at the wearable computing device 204. For example, determining 310 whether further input is to be received may include determining whether an entire word has been entered, or determining whether the user wishes to continue entering input. If it is determined 310 that further user input is to be received, the finger ring-like sensor device 202 may return to detecting 302 motion by the ring-like sensor device 202. If it is determined 310 that no further input is to be received, the input process may be complete.

Figure 4:
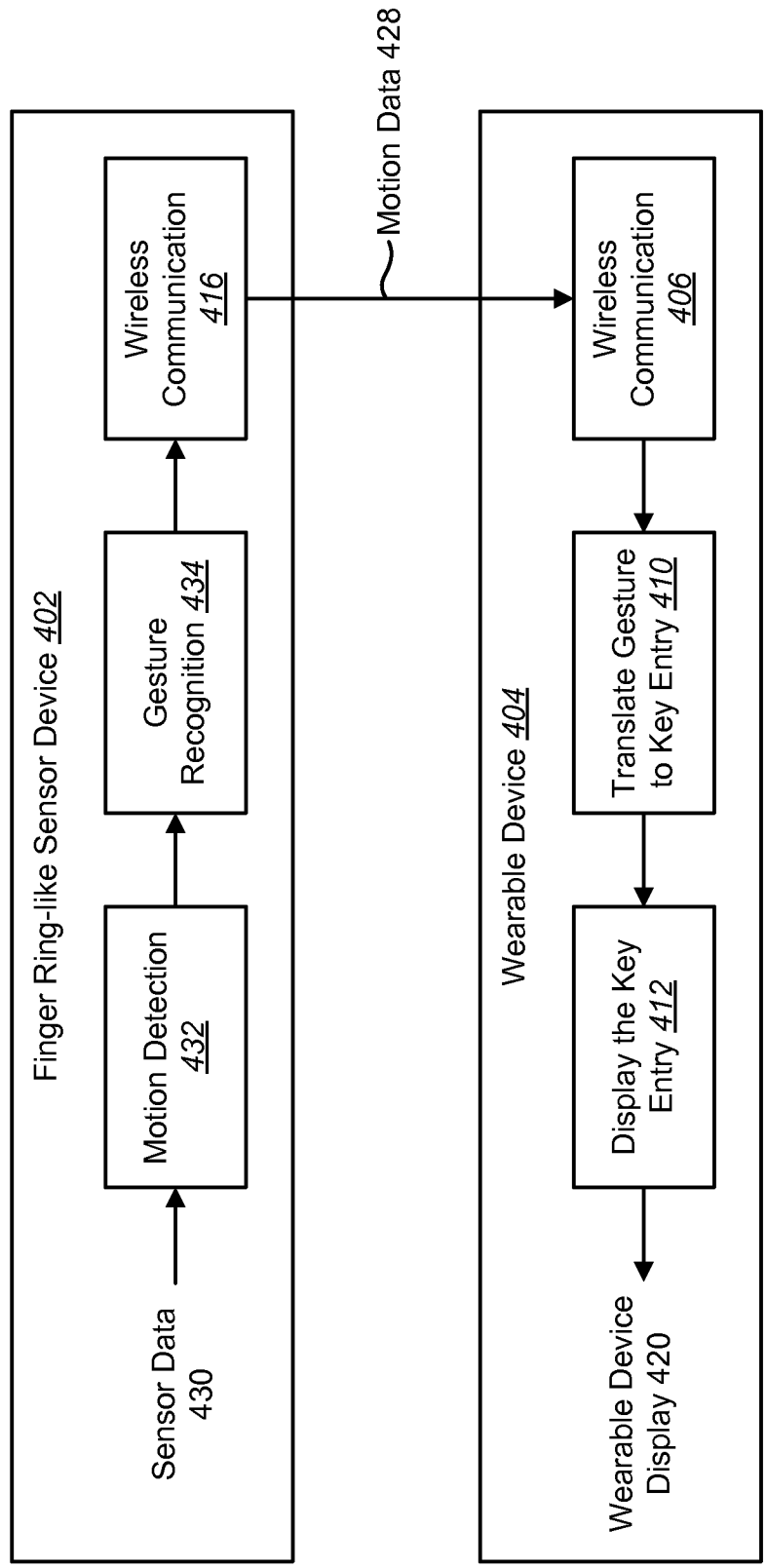
FIG. 4 illustrates one configuration of a high-level process diagram of a finger ring-like sensor device and a wearable device.

FIG. 4 illustrates one configuration of a high-level process diagram of a finger ring-like sensor device 402 transmitting motion data 428 to a wearable device 404. The motion detection process 432 in the finger ring-like device 402 collects raw sensor data 430 from the sensors and detects relevant finger motions while eliminating noises and triggers the gesture recognition process 434. The gesture recognition process 434 then detects certain designated finger motions, such as tapping on a physical surface and moving (or swiping) toward the left, right, up, down or diagonal, etc. The gesture recognition process 434 may output a limited number of gestures based on the motion it receives. For example, in one configuration, the gesture recognition process 434 may output one of the following gestures: Up, Down, Left, Right. In another configuration, the gesture recognition process 434 may output one of the following gestures: Up, Up-Left (i.e., diagonally upward and to the left), Left, Down-Left (i.e., diagonally downward and to the left), Down, Down-Right (i.e., diagonally downward and to the right), Right, Up-Right (i.e., diagonally upward and to the right). The gesture output may then be used to select a key on the wearable device 404. The detected gestures are transmitted to the wearable device 404 via a wireless communication process 416 in the form of motion data 428. The motion data 428 may include information indicating direction and distance of the finger movement. For example, it may send X, Y, Z coordinates from a starting position and an ending position. Alternatively, it may simply send a direction, such as Left, Right, Up or Down, as described above.

By way of example, one possible protocol that may be used is the Bluetooth Serial Port Profile (SPP). Position and action information, such as Position: X,Y; or Action: tap, may be sent using Bluetooth SPP.

The wearable device 404 receives the gestures via motion data 428 through a wireless communication process 406. Software running on the wearable device 404 takes in coordinate information such as motion data 428 and translates 410 the gestures to the corresponding actions on the virtual keyboard/keypad presented 412 on the wearable device display 420.

Figure 5A:
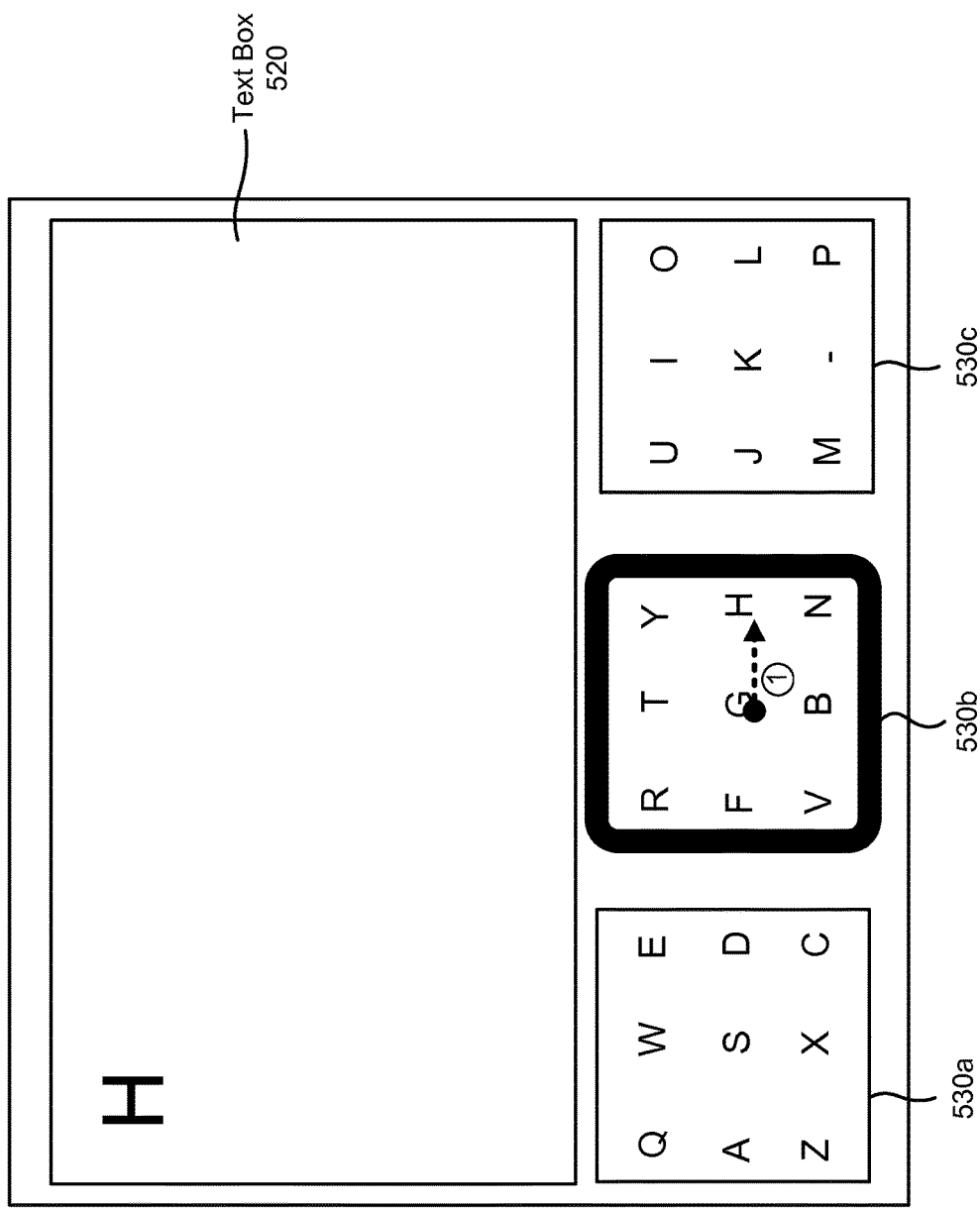
FIG. 5A is a diagram illustrating an example of a step in the process for using a finger ring-like device to enter the word "HELLO" on a wearable device.

FIG. 5A is a diagram illustrating an example of a step in the process for using a finger ring-like device 102 to enter the word "HELLO" on a wearable device 104, where the finger ring-like device 102 is in wireless electronic communication with the wearable device 104. This figure illustrates the display 220 a user would see on the wearable device 104. The display 220 may include a smart device virtual keyboard layout that is divided into a plurality of segments. Each segment may correspond to two or more keys of the virtual keyboard. The relative position of the segments may define which gestures can be used to select a particular segment. In the configuration shown in FIGS. 5A-5C, three segments 530a-c divide the virtual keyboard layout. The three segments 530a-c are positioned below a text box 520 where selected text appears.

Figure 5B:
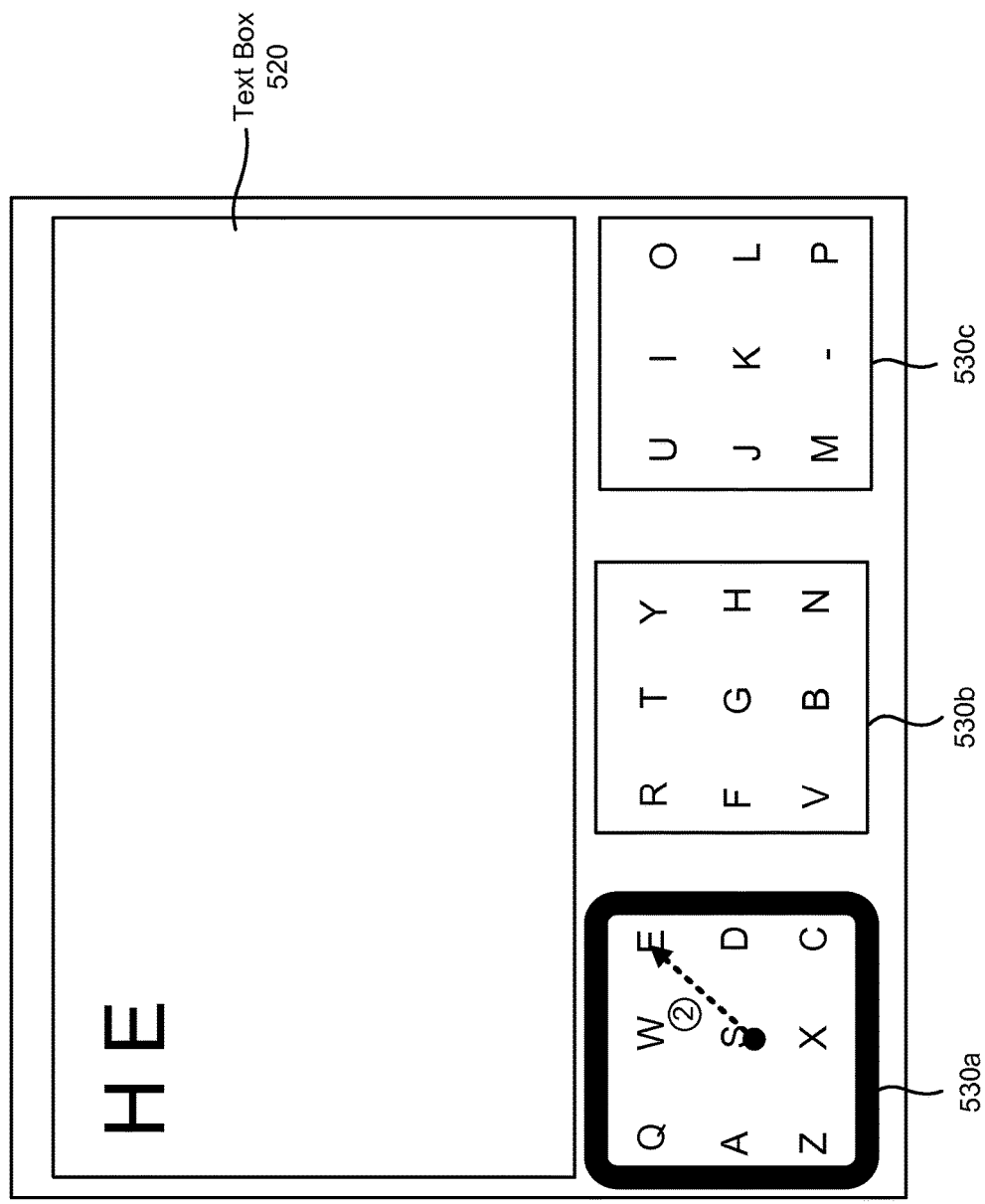
FIG. 5B is a diagram illustrating an example of a step in the process for using a finger ring-like device to enter the word "HELLO" on a wearable device.
Figure 5C:
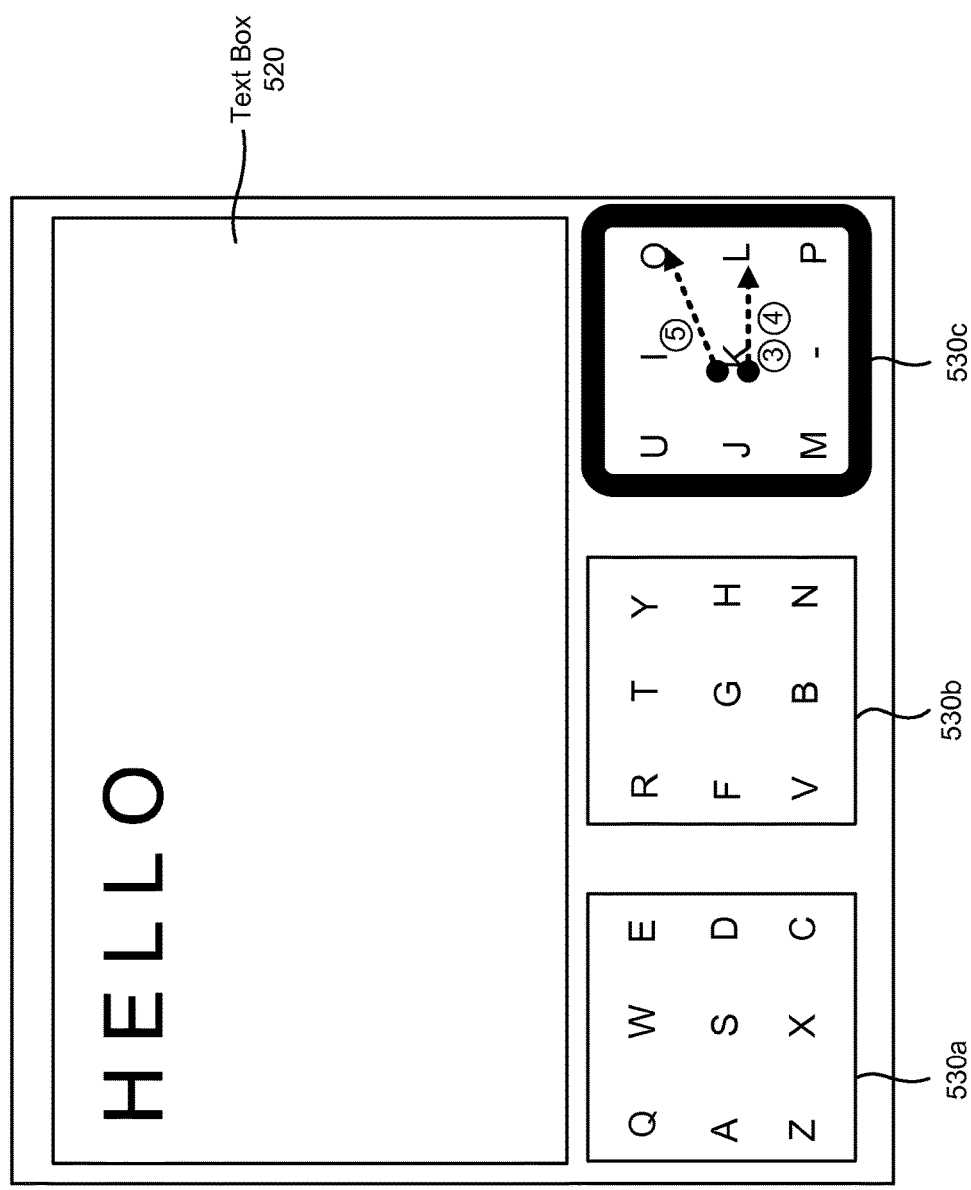
FIG. 5C is a diagram illustrating an example of a step in the process for using a finger ring-like device to enter the word "HELLO" on a wearable device.

Normally, the user would rest his/her wrist on a physical surface such as a table, an arm rest, leg, etc. In the example of FIGS. 5A-5C, a user will enter the word "HELLO" on the wearable computing device 104 using the sensor device 102. Initially, the wearable computing device 104 is not in text entry mode and is then placed into text entry mode. When the wearable computing device 104 enters text entry mode, the text box 520, initially empty, is displayed above the virtual keyboard layout that has been divided into a plurality of segments 530a-c. As the user moves the sensor device 102, using a finger, horizontally, one of the three keyboard segments 530a-c, each of which includes designated letters, is highlighted indicating the currently selected segment. The user first uses the sensor device 102 to highlight the selected segment. In this case, the user wishes to select the letter "H", so he or she must first select the middle segment 530b. In this configuration, the middle segment 530b is highlighted or selected by default, indicated in FIG. 5A with a bold line. As a result, the user does not need to move the sensor device in order to select a different segment. With the correct segment 530b selected, the user then taps a physical surface which signals that the segment selection has been accomplished and the device 104 may now enter the key selection process. Depending on what kind of characters the virtual keyboard has, a key may correspond to a letter, a number, a symbol or any other character that may be selected through the use of a regular keyboard.

The user selected the desired segment 530b by using his or her finger with the ring-like sensor device 402 to tap a surface to select the correct keyboard segment 530a-c. In the next action, the user selects the desired letter by swiping his or her finger toward the direction of the preferred letter. In this case, where a user is selecting the letter "H", the user moves his or her finger in a substantially straight horizontal swiping motion toward the right (illustrated by the "1" in FIG. 5A). This single swipe motion determines the selected text entry (of the letter "H"), which is then displayed in the text box 520 as shown. In summary, the user's actions to enter the letter "H" once the device 104 was placed into text entry mode was to simply tap down on a physical surface and then swipe horizontally right with the finger having the sensor device 102.

FIG. 5B is a diagram illustrating an example of a step in the process for using a finger ring-like device 102 to enter the word "HELLO" on a wearable device 104. Once the letter "H" has been entered as described above in FIG. 5A, a user may perform the necessary steps to enter the letter "E", which steps are illustrated in FIG. 5B. By default, the middle segment 530b may be initially selected. The user may move his or her finger with the finger ring-like sensor device 102 toward the left in order to highlight the first keyboard segment 530a, where the letter E is located, and tap a surface using that finger to select the segment 530a. Once the segment 530a has been selected, a user may swipe his or her finger in an upward diagonal motion toward the upper right, which selects the letter E and displays it on the text box 520 (the swiping motion is illustrated by the "2" in FIG. 5B).

FIG. 5C is a diagram illustrating an example of a step in the process for using a finger ring-like device 102 to enter the word "HELLO" on a wearable device 104. Once the letters "H" and "E" have been entered as described above in FIGS. 5A and 5B, a user may perform the necessary steps to enter the rest of the letters for the word "HELLO" ("LLO"), which steps are illustrated in FIG. 5C. By default, the middle segment 530b may be initially selected. The user may move his or her finger with the finger ring-like sensor device 102 toward the right in order to highlight the third keyboard segment 530c and tap a surface using that finger to select the segment. Once the segment 530c has been selected, a user may swipe his or her finger in a substantially straight motion toward the right, which selects the letter "L" (illustrated by the "3" in FIG. 5C). A user may repeat the same steps in order to select the letter "L" a second time (illustrated by the "4" in FIG. 5C). A user may select the third keyboard segment 530c again, and then swipe his or her finger in an upward diagonal motion toward the right, which selects the letter "O" (illustrated by the "5" in FIG. 5C). As the user selects each key or letter, it appears in the text box 520 to complete the entry of the word "HELLO."

Figure 6A:
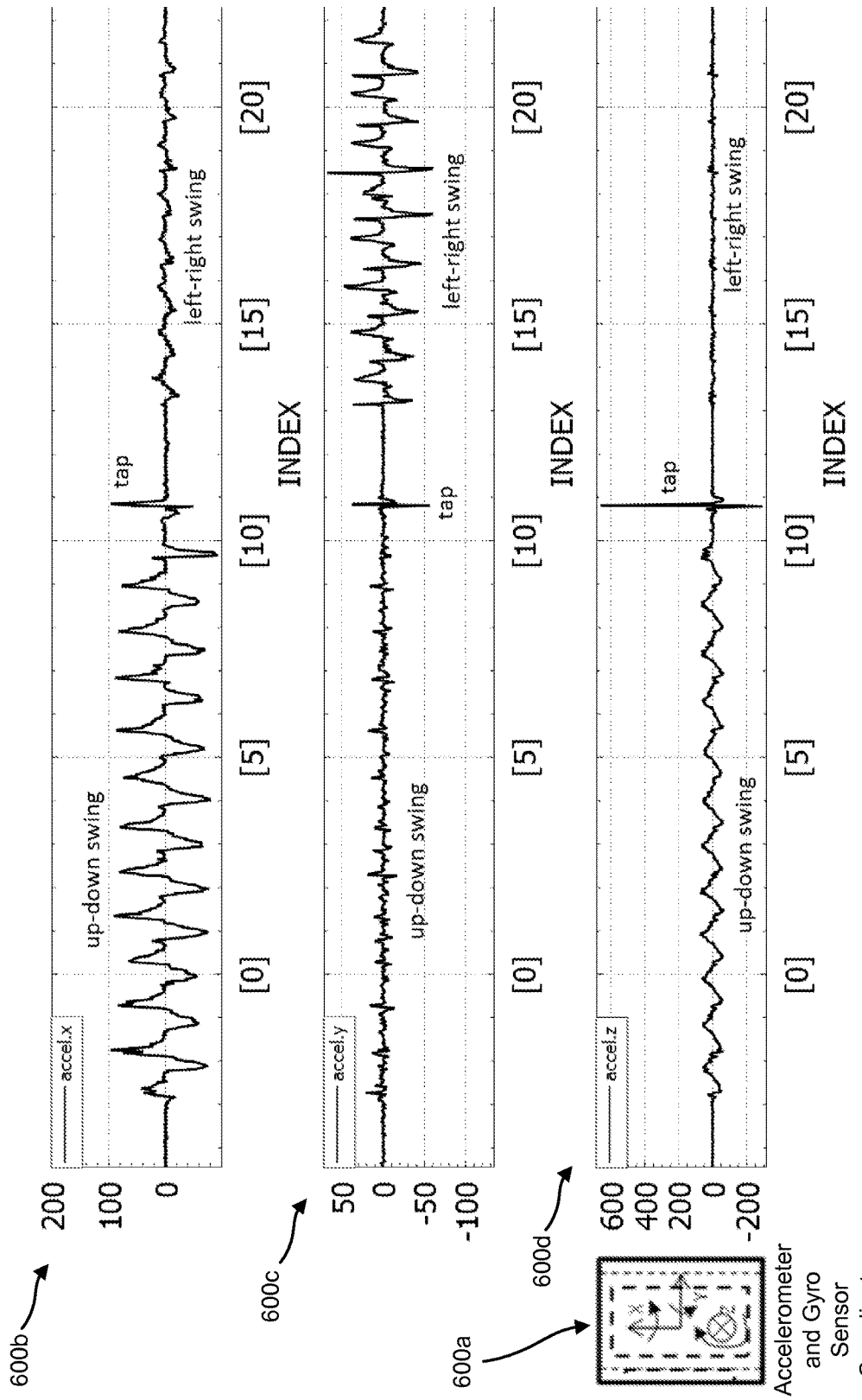
FIGS. 6A-6B illustrate waveforms of sample signals captured from a finger ring-like device accelerometer and gyroscope sensor.
Figure 6B:
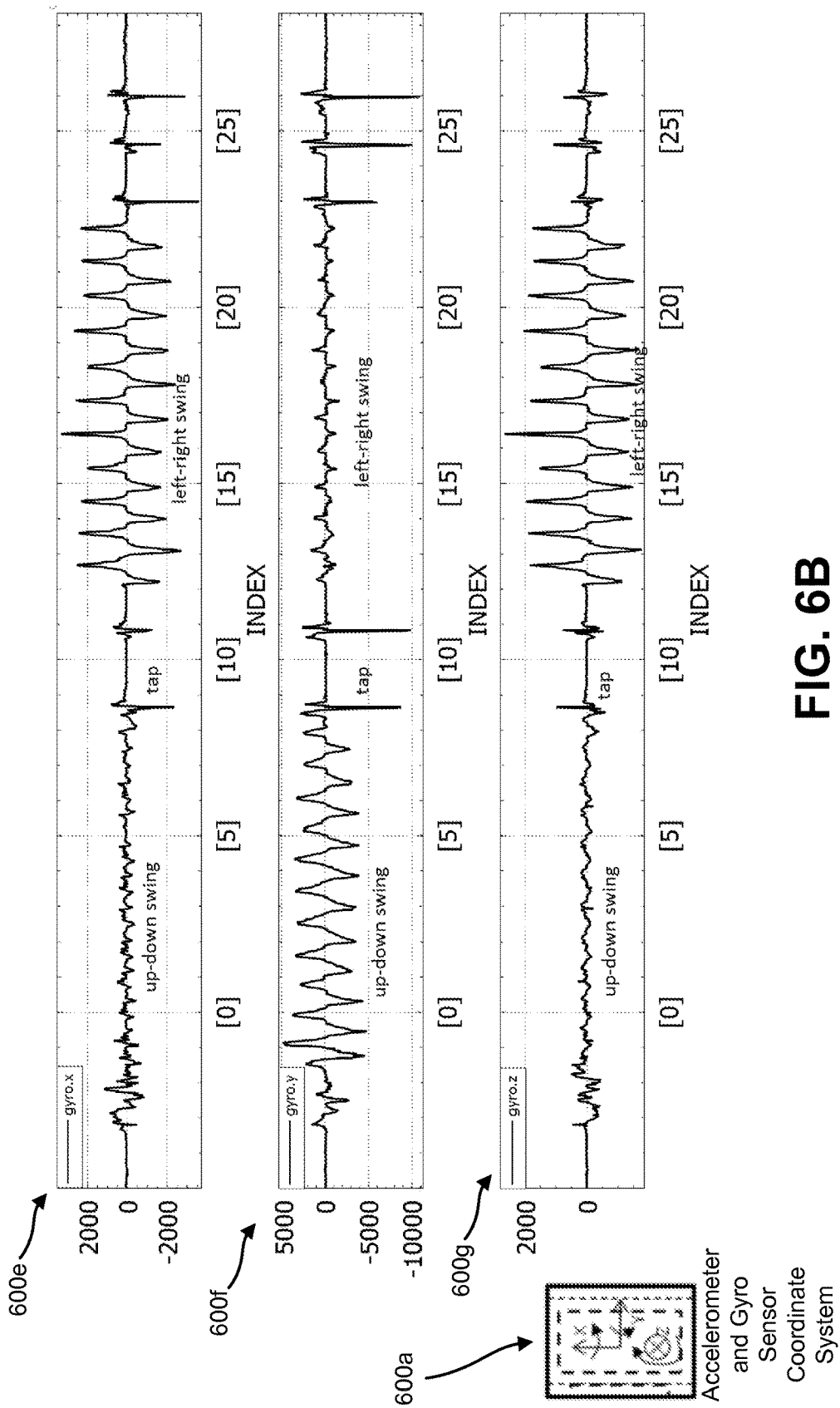

FIGS. 6A-6B illustrate waveforms of sample signals captured from a finger ring-like device 202 accelerometer sensor 210 and gyroscope sensor 212. The waveforms 600e, 600f, 600g of FIG. 6B represent gyroscope sensor data. The waveforms 600b, 600c, 600d of FIG. 6A represent accelerometer data. The X, Y, Z coordinate system 600a is also shown for the accelerometer sensor 210 and gyroscope sensor 212. In one configuration, each gyroscope channel may measure the rotation around one of the accelerometer axes. For instance, a 3-axes gyroscope may be used to measure the rotation around the X, Y and Z axes. These exemplary signals were captured while a user's finger with the ring-like sensor device 102 was performing the following actions (which are labeled on FIGS. 6A-6B): tapping, up-down swing, left-right swing. As shown, tapping a physical surface has special characteristics in signals 600b, 600c, 600d from the accelerometer sensor 210 and in signals 600e, 600f, 600g from the gyroscope sensor 212. A tap normally shows in a very high peak, or a high altitude spike, in both the accelerometer sensor 210 signals 600b, 600c, 600d and the gyroscope sensor 212 signals 600e, 600f, 600g. As shown in FIGS. 6A-6B, the tap can be identified with the spike in the signals. This display of a tap is visually distinguishable from finger swiping or other gestures in air. Characteristics identified in the exemplary waveforms 600b, 600c, 600d, 600e, 600f, 600g of FIGS. 6A-6B for different gestures are identified and discussed in FIG. 7, below.

Figure 7:
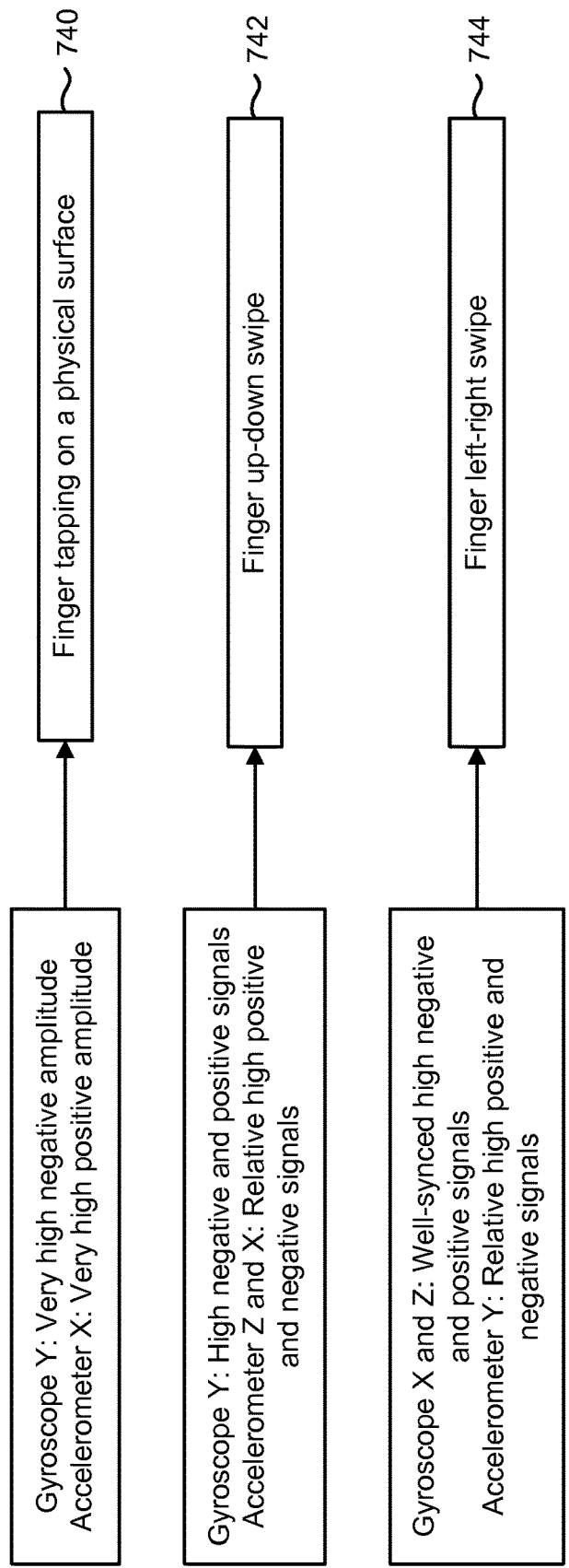
FIG. 7 illustrates one exemplary implementation of recognizing the motion and gesture direction by unique characteristics of the signals in a finger ring-like device accelerometer and gyroscope sensor coordinate system.

FIG. 7 illustrates one exemplary implementation of recognizing the motion and gesture direction by unique characteristics of the signals 600b, 600c, 600d, 600e, 600f, 600g of FIGS. 6A-6B generated by a sensor device 202 accelerometer 210 and gyroscope sensor 212.

To determine whether the user's finger is tapping on a physical surface, the computing device 104 may analyze the gyroscope Y signal and the accelerometer X signal. If the gyroscope Y signal shows a very high negative amplitude and the accelerometer X signal shows a very high positive amplitude, the data may be recognized as finger tapping on a physical surface 740.

To determine whether the user's finger is swiping up-down, the computing device 104 may analyze the gyroscope Y signal and the accelerometer Z and X signals. If the gyroscope Y signal shows high negative and positive signals and the accelerometer Z and X signals shows relative high positive and negative signals, the data may be recognized as a finger up-down swipe 742.

To determine whether the user's finger is swiping left-right, the computing device 104 may analyze the gyroscope X and Z signals and the accelerometer Y signal. If the gyroscope X and Z signals show well-synced high negative and positive signals and the accelerometer Y signal shows relative high positive and negative signals, the data may be recognized as a finger left-right swipe 744.

Figure 8A:
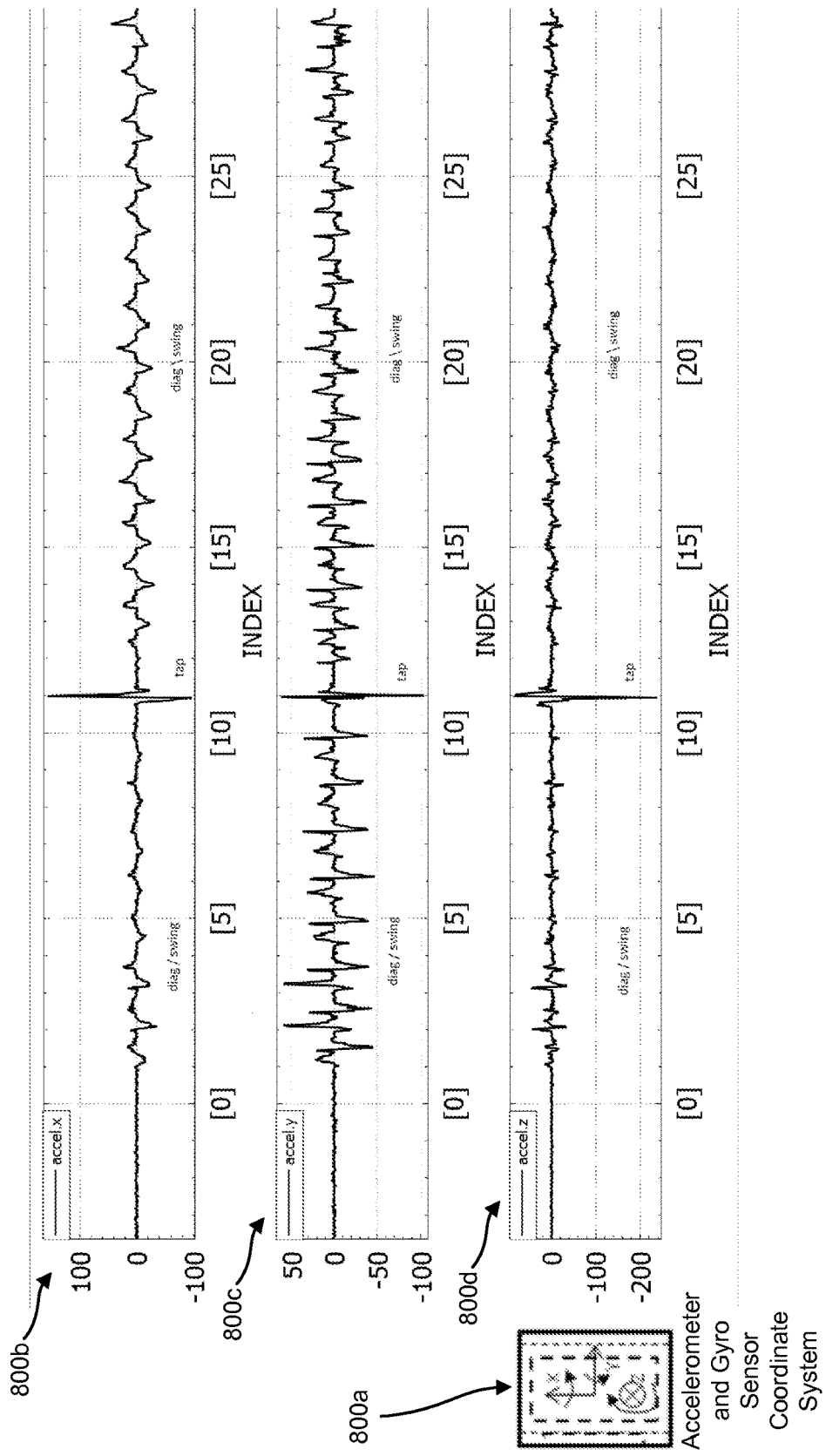
FIGS. 8A-8B illustrate waveforms of sample signals captured from a finger ring-like device accelerometer and gyroscope sensor.
Figure 8B:
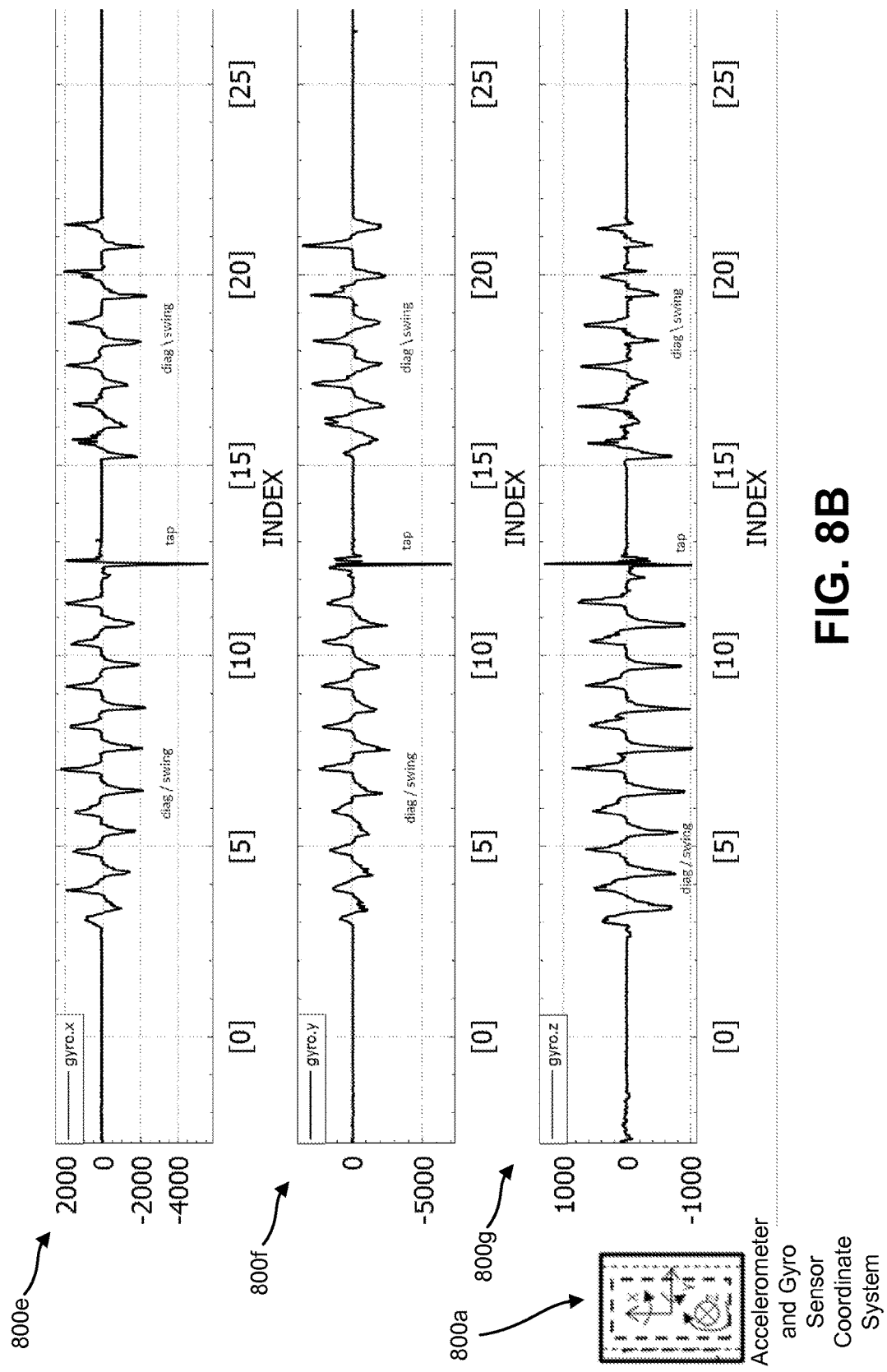

FIGS. 8A-8B illustrates waveforms of sample signals captured from a finger ring-like device 202 accelerometer sensor 210 and gyroscope sensor 212 when a finger with the ring-like device 202 is performing a diagonal swiping motion and also when it is performing a tapping action. The waveforms 800e, 800f, 800g of FIG. 8B represent gyroscope sensor data. The waveforms 800b, 800c, 800d of FIG. 8A represent accelerometer data. The coordinate systems are the same as those illustrated in FIGS. 6A-6B. Characteristics identified in the exemplary waveforms 800b-800g of FIGS. 8A-8B for different gestures are identified and discussed in FIG. 9, below.

Figure 9:
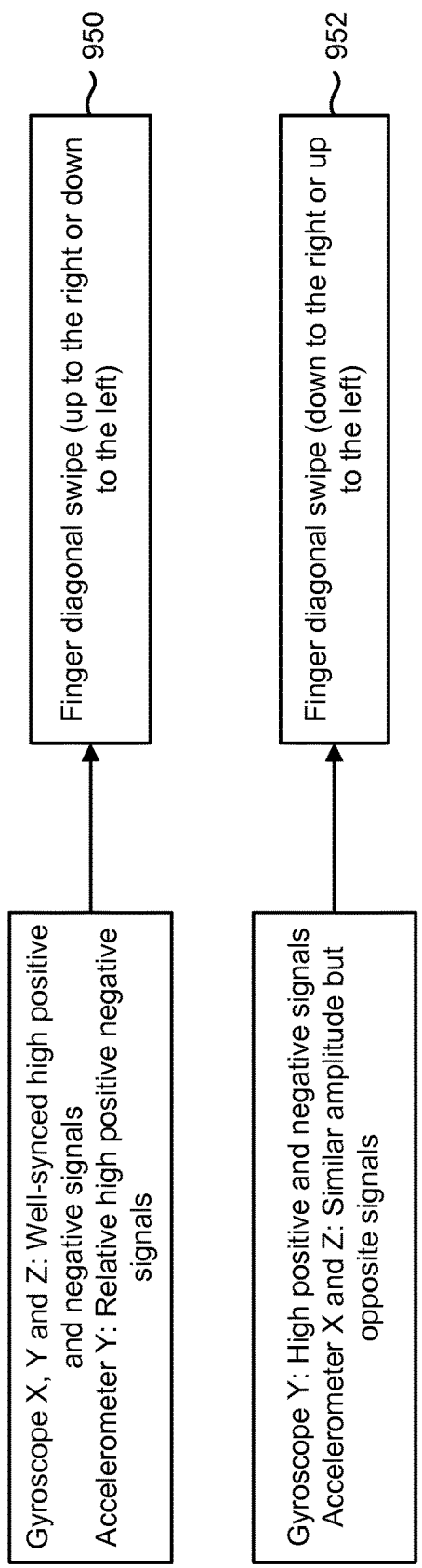
FIG. 9 illustrates another exemplary implementation of recognizing the motion and gesture direction by unique characteristics of the signals in a finger ring-like device accelerometer and gyroscope sensor coordinate system.

FIG. 9 illustrates another exemplary implementation of recognizing the motion and gesture direction by unique characteristics of the signals 800b-800g of FIGS. 8A-8B generated by a sensor device 202 accelerometer 210 and gyroscope sensor 212.

To determine whether the user's finger is performing a diagonal swipe up and to the right, the computing device 104 may analyze the gyroscope X, Y and Z signals and the accelerometer Y signal. If the gyroscope X, Y and Z signals are well-synced high positive and negative signals and the accelerometer Y signal shows relative high positive and negative signals, the data may be recognized as a finger diagonal swiping upward to the right 950. In one possible configuration, a positive gyro signal may indicate swiping up and to the right, while a negative gyro signal may indicate swiping down and to the left.

To determine whether the user's finger is performing a diagonal swipe down and to the right or up and to the left, the computing device 104 may analyze the gyroscope Y signal and the accelerometer X and Z signals. If the gyroscope Y signal shows high positive and negative signals and the accelerometer X and Z signals show similar amplitude but opposite signals, the data may be recognized as a finger diagonal swipe downward to the right 952. In one possible configuration, a positive gyro signal may indicate swiping up and to the left, while a negative gyro signal may indicate swiping down and to the right.

The present systems and methods provide benefits and advantages over other text entry techniques. For example, the present systems and methods do not limit the configuration of the virtual keyboard/keypad. For example, a telephone-like 12-key keypad can be used. In one implementation, a letter is entered by tapping one key followed by a directional gesture. In another implementation, multiple tapping in a short time duration is used to select a letter from the letters assigned to the same key. Alternatively, the process of detecting gestures can be performed in the wearable device 104 rather than on the sensor device 102. In this case, the noise-reduced motion data is transmitted wirelessly from the sensor device 102 to the wearable computing device 104.

In addition to the embodiments mentioned earlier, the finger ring-like device 102 may be equipped with a touch sensor on the side surface of the ring. In some implementations, users touch the sensor by thumb to invoke special commands or events, such as shift, caps lock and changing the character set.

The present systems and methods offer distinguishing features beyond systems currently found on the market for recognizing text entry on a wearable device. One such feature is the detection of relative finger movements and selection of the key in the virtual keyboard/keypad that the user intends to hit. The present systems and methods provide the ability to detect a user's intention to hit (click) the selected key by a finger motion, such as tapping. The present systems and methods detect finger motion of left, right, up, down, diagonal, tapping, etc., and translate the motion into key entry for text input. Existing products on the market generally manipulate or control a computer cursor or object or detect movement related to drawing different characters such as handwriting.

In the present systems and methods, the virtual keyboard/keypad may be physically separated from the user's finger movements. Existing products on the market generally require physical contact between a user and a virtual keyboard/keypad, but this invention does not require the user to physically touch the keyboard/keypad. Further, this invention enables the user to move his or her finger wearing the ring-like device in free space (e.g., without regard to the location of the wearable computing device and not in any predetermined input region) and enables the use of a tapping motion against any physical surface. Existing configurations available on the market often require a device to have touch-sensitive input means, whereas this configuration requires no physical contact with a device.

The present systems and methods require smaller processing power compared to existing products on the market. Since the wearable device isn't receiving a continuous stream of raw data from the finger ring-like sensor, less processing power is required, which is advantageous for small devices with limited battery capacity. In this configuration, some partial processing is done in the local device (finger ring-like sensor 102), which minimizes the data sent over wireless communication. The finger ring-like sensor 102 may send data in the form of direction of finger movement, distance of finger movement, etc., to the wearable device 104.

Other products for text entry on wearable devices require the use of a remote control device and a proximity sensor to detect finger motion. The present systems and methods may use only a motion sensor to detect finger motion, rather than using a motion sensor to detect position and a proximity sensor to provide scaling control for a remote control device. It differs from some systems in that the wearable device does not need to work with a touch screen and is not to create a remote haptic effect. Further, the tapping surface could be any physical surface, not a predetermined input region, and the surface does not provide location information, as other products require.

Whereas some text entry devices use a sensor to provide an indication of a scroll direction, the present systems and methods do not utilize a cursor or scrolling function and instead detect finger motion and tapping movement and translate the motion into key entries for text input. Accelerometer sensors and gyroscope sensors detect motion, but do not utilize image capture and recognition as some other existing products do. The present systems and methods may not be based on an image and may not use an image.

In some other systems, the input device may include a micro-vibration sensor, a displacement sensor, a communication unit and a microcontroller, wherein when sensing that the input device is vibrated, the micro-vibration sensor generates a vibration induction signal. The displacement sensor then senses the movement of the input device and converts the sensed movement to a movement signal; when receiving the signal, the microcontroller generates a trajectory control signal, transmits the trajectory control signal to the external electronic device through the communication unit and controls the movement trajectory of the display cursor of the external electronic device. In such other systems, a user can utilize the input device to control the movement of the display cursor of the external electronic device and conveniently draw a required trajectory on the external electronic device. The present systems and methods are different in that they include a ring-like device worn on a finger to detect finger motion in free space and tapping on a physical surface, and the present systems and methods then translate the motion into key entry for text input. The present systems and methods are different from this other system that requires a micro-vibration sensor and a displacement sensor because they operate differently. In addition, the present systems and methods do not utilize a micro-vibration sensor.

In yet another system, laser scanning may be used. A digital circuit analyzes a position sensor to obtain data of a finger position and to recognize a knocking finger as well as to recognize a moving mode of the hand. However, the present systems and methods use an accelerometer and gyro sensors to detect motion and do not use laser scanning.

Figure 10:
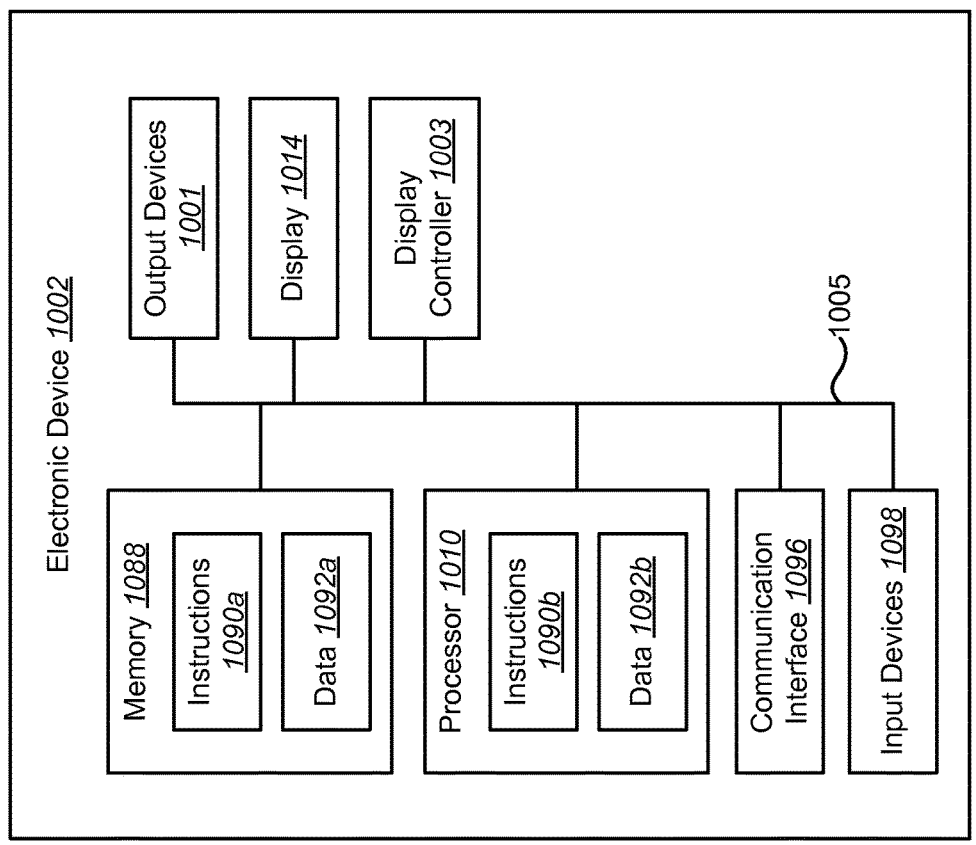
FIG. 10 illustrates various components that may be utilized in an electronic device generally.

FIG. 10 illustrates various components that may be utilized in an electronic device 1002 generally. Embodiments of electronic devices 1002 may include, for example, a more general configuration of a finger ring-like sensor device 102 or a more general configuration of a wearable computing device 104.

The electronic device 1002 includes a processor 1010 that controls operation of the electronic device 1002. The processor 1010 may also be referred to as a central processing unit (CPU). Memory 1088, which may include both read-only memory (ROM), random access memory (RAM) or any type of device that may store information, provides instructions 1090a and data 1092a to the processor 1010. A portion of the memory 1088 may also include non-volatile random access memory (NVRAM). Instructions 1090b and data 1092b may also reside in the processor 1010. Instructions 1090b and/or data 1092b loaded into the processor 1010 may also include instructions 1090a and/or data 1092a from memory 1088 that were loaded for execution or processing by the processor 1010. The instructions 1090b may be executed by the processor 1010 to implement the systems and methods disclosed herein.

The electronic device 1002 may include one or more communication interfaces 1096 for communicating with other electronic devices. The communication interfaces 1096 may be based on wired communication technology, wireless communication technology, or both. Examples of communication interfaces 1096 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 1002 may include one or more output devices 1001 and one or more input devices 1098. Examples of output devices 1001 include a speaker, printer, etc. One type of output device that may be included in an electronic device 1002 is a display device 1014. Display devices 1014 used with configurations disclosed herein may utilize any suitable image projection technology, such as a cathode ray tube (CRT), liquid crystal display (LCD), light-emitting diode (LED), gas plasma, electroluminescence or the like. A display controller 1003 may be provided for converting data stored in the memory 1088 into text, graphics and/or moving images (as appropriate) shown on the display 1014. Examples of input devices 1098 include a keyboard, mouse, microphone, remote control device, button, joystick, trackball, touchpad, touchscreen, lightpen, etc.

The various components of the electronic device 1002 are coupled together by a bus system 1005, which may include a power bus, a control signal bus and a status signal bus, in addition to a data bus. However, for the sake of clarity, the various buses are illustrated in FIG. 10 as the bus system

1005. The electronic device 1002 illustrated in FIG. 10 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, Electrically Erasable Programmable Read-Only Memory (EEPROM), Compact Disc Read-Only Memory (CD-ROM) or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A system for text entry for a computing device, comprising:
   a single wearable ring-like sensor device including one or more sensors for detecting finger movements and for providing motion data, the motion data comprising an acceleration of a finger to which the single wearable ring-like sensor device is attached;
   a computing device in communication with the single wearable ring-like sensor device, the computing device including:
      a display; and
      a processor, the processor configured to:
         present on the display a user input screen having a text box and keys for selecting text to be entered in the text box, the user input screen comprising a virtual keyboard layout displayed as a plurality of divided segments, each of the plurality of divided segments comprising two or more of the keys for selecting text arranged in a predefined arrangement within a corresponding segment;
         receive the motion data from the single wearable ring-like sensor device;
         derive and identify a predefined gesture from the motion data, the predefined gesture comprising one of a tapping gesture and a swiping gesture in a predefined direction of the acceleration of the finger;
      the processor further configured to enter a text entry mode and, upon entering the text entry mode, the processor configured to:
         identify an initial swiping gesture to highlight a displayed segment, the displayed segment appearing visually highlighted;
         identify a tapping gesture to select the highlighted displayed segment identified by the initial swiping gesture;
         identify a swiping gesture to select a particular key of the two or more keys within the selected highlighted displayed segment identified by the initial swiping gesture;
         present text in the text box associated with the particular key selected by the swiping gesture.

2. The system of claim 1, wherein a user does need not physically touch the computing device to select a key on the computing device.

3. The system of claim 1, wherein a user selects a key on the computing device through a finger motion of a single finger wearing the single wearable ring-like sensor device.

4. The system of claim 3, wherein the finger motion is in free space.

5. The system of claim 1, wherein the computing device comprises a smart watch.

6. The system of claim 1, wherein the computing device comprises smart glasses.

7. The system of claim 1, wherein the single wearable ring-like sensor device comprises an accelerometer.

8. The system of claim 1, wherein the single wearable ring-like sensor device comprises a gyroscope.

9. A method for entering text on a computing device, comprising:
   detecting finger movements and for providing motion data from a single wearable ring-like sensor device including one or more sensors, the motion data comprising an acceleration of a finger to which the single wearable ring-like sensor device is attached;
   transmitting the motion data to the computing device;
   presenting on a display a user input screen having a text box and keys for selecting text to be entered in the text box, the user input screen comprising a virtual keyboard layout displayed as a plurality of divided segments, each of the plurality of divided segments comprising two or more of the keys for selecting text arranged in a predefined arrangement within a corresponding segment;
   receiving the motion data from the single wearable ring-like sensor device;
   deriving and identifying a predefined gesture from the motion data, the predefined gesture comprising one of a tapping gesture and a swiping gesture in a predefined direction of the acceleration of the finger;
   entering a text entry mode, upon entering the text entry mode:
      identifying an initial swiping gesture to highlight a displayed segment, the displayed segment appearing visually highlighted;
      identifying a tapping gesture to select the highlighted displayed segment identified by the initial swiping gesture;

identifying a swiping gesture to select a particular key of the two or more keys within the selected highlighted displayed segment identified by the initial swiping gesture;

presenting text in the text box associated with the particular key selected by the swiping gesture.

10. The method of claim 9, wherein a user does need not physically touch the computing device to select a key on the computing device.

11. The method of claim 9, wherein a user selects a key on the computing device through a finger motion of a single finger wearing the single wearable ring-like sensor device.

12. The method of claim 11, wherein the finger motion is in free space.

13. The method of claim 9, wherein the computing device comprises a smart watch.

14. The method of claim 9, wherein the computing device comprises smart glasses.

15. The method of claim 9, wherein the single wearable ring-like sensor device comprises at least one of an accelerometer and a gyroscope.

16. A non-transitory computer-readable medium having instructions thereon, the instructions comprising:

code for detecting finger movements and for providing motion data from a single wearable ring-like sensor device including one or more sensors, the motion data comprising an acceleration of a finger to which the single wearable ring-like sensor device is attached;

code for transmitting the motion data to a computing device;

code for presenting on a display a user input screen having a text box and keys for selecting text to be entered in the text box, the user input screen comprising a virtual keyboard layout displayed as a plurality of divided segments, each of the plurality of divided segments comprising two or more of the keys for selecting text arranged in a predefined arrangement within a corresponding segment;

code for receiving the motion data from the single wearable ring-like sensor device;

code for deriving and identifying a predefined gesture from the motion data, the predefined gesture comprising one of a tapping gesture and a swiping gesture in a predefined direction of the acceleration of the finger;

code for entering a text entry mode, upon entering the text entry mode:

code for identifying an initial swiping gesture to highlight a displayed segment, the displayed segment appearing visually highlighted;

code for identifying a tapping gesture to select the highlighted displayed segment identified by the initial swiping gesture;

code for identifying a swiping gesture to select a particular key of the two or more keys within the selected highlighted displayed segment identified by the initial swiping gesture;

code for presenting text in the text box associated with the particular key selected by the swiping gesture.

17. A system for text entry for a computing device, comprising:

a single wearable ring-like sensor device for detecting finger movements and for providing motion data, the motion data comprising an acceleration of a single finger to which the single wearable ring-like sensor device is attached;

a computing device in communication with the single wearable ring-like sensor device, the computing device including:

a display; and a processor, the processor configured to:

present a user input screen on the display, the user input screen having a text box and keys for selecting text to be entered in the text box, the user input screen comprising a virtual keyboard layout displayed as a plurality of divided segments, each of the plurality of divided segments comprising two or more of the keys for selecting text arranged in a predefined arrangement within a corresponding segment;

receive the motion data from the single wearable ring-like sensor device;

derive and identify a predefined gesture from the motion data, the predefined gesture comprising one of a tapping gesture and a swiping gesture in a predefined direction of the acceleration of the single finger;

the processor further configured to enter a text entry mode and, upon entering the text entry mode, the processor configured to:

identify an initial swiping gesture to highlight a displayed segment, the displayed segment appearing visually highlighted;

identify a tapping gesture to select the highlighted displayed segment identified by the initial swiping gesture;

identify a swiping gesture to select a particular key of the two or more keys within the selected highlighted displayed segment identified by the initial swiping gesture;

present text on the display in the text box associated with the particular key selected by the swiping gesture.

18. The system of claim 17, wherein the single wearable ring-like sensor device includes an accelerometer sensor.

19. The system of claim 17, wherein the single wearable ring-like sensor device includes a gyroscope sensor.

* * * * *